(12) United States Patent
Zhu

(10) Patent No.: US 11,190,773 B2
(45) Date of Patent: Nov. 30, 2021

(54) VIDEO CODER-BASED CODE RATE CONTROL METHOD AND DEVICE, AND VIDEO SERVER

(71) Applicant: ARASHI VISION INC., Shenzhen (CN)

(72) Inventor: Li Zhu, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 16/634,548

(22) PCT Filed: Jul. 13, 2018

(86) PCT No.: PCT/CN2018/095610
§ 371 (c)(1),
(2) Date: Jan. 27, 2020

(87) PCT Pub. No.: WO2019/019931
PCT Pub. Date: Jan. 31, 2019

(65) Prior Publication Data
US 2021/0092400 A1    Mar. 25, 2021

(30) Foreign Application Priority Data
Jul. 28, 2017    (CN) .......................... 201710632656.9

(51) Int. Cl.
*H04N 19/146*    (2014.01)
*H04N 19/172*    (2014.01)

(52) U.S. Cl.
CPC ......... *H04N 19/146* (2014.11); *H04N 19/172* (2014.11)

(58) Field of Classification Search
CPC ........................ H04N 19/146; H04N 19/172
See application file for complete search history.

(56) References Cited

U.S. PATENT DOCUMENTS

| 2006/0239563 A1* | 10/2006 | Chebil | G11B 27/034 |
| | | | 382/232 |
| 2007/0143807 A1* | 6/2007 | Suneya | H04N 21/8456 |
| | | | 725/115 |
| 2007/0153916 A1* | 7/2007 | Demircin | H04N 21/23805 |
| | | | 375/240.26 |

(Continued)

FOREIGN PATENT DOCUMENTS

| CN | 102098571 A | 6/2011 |
| CN | 103561283 A | 2/2014 |

(Continued)

*Primary Examiner* — Joseph Suh
(74) *Attorney, Agent, or Firm* — Cheng-Ju Chiang

(57) ABSTRACT

The invention is applicable to the field of videos and provides a video coder-based code rate control method and device, and a video server. The method comprises the following steps: in the video playback process, when a code rate needs to be switched, modifying time stamps of frames transmitted to the video coder in a switching process; transmitting, to the video coder, the frames having modified time stamps; and for each frame output by the video coder, restoring the time stamp of the output frame to be the original time stamp. The present invention avoids the stuttering resulted from interruption of coding, providing a very smooth switching process.

9 Claims, 1 Drawing Sheet

(56) References Cited

U.S. PATENT DOCUMENTS

| | | | | |
|---|---|---|---|---|
| 2007/0270103 A1* | 11/2007 | Kim | .................... | H04L 1/1893 |
| | | | | 455/69 |
| 2011/0187926 A1* | 8/2011 | Kim | ........................ | H04N 7/00 |
| | | | | 348/497 |
| 2014/0078398 A1* | 3/2014 | Shenoy | ................... | G06T 13/80 |
| | | | | 348/515 |
| 2014/0112384 A1 | 4/2014 | Van Veldhuisen et al. | | |
| 2015/0338915 A1* | 11/2015 | Publicover | ............ | G06F 3/0304 |
| | | | | 345/633 |
| 2016/0088300 A1* | 3/2016 | Frishman | ............. | H04N 19/174 |
| | | | | 375/240.03 |
| 2017/0359555 A1* | 12/2017 | Irani | ................... | H04L 12/2818 |
| 2018/0228555 A1* | 8/2018 | Charron | ................. | G06F 3/012 |
| 2018/0234479 A1* | 8/2018 | Lilienthal | ................ | G06F 21/31 |
| 2018/0296281 A1* | 10/2018 | Yeung | .................. | G06K 9/6271 |
| 2018/0316904 A1* | 11/2018 | Uchidate | ............. | H04N 13/296 |

FOREIGN PATENT DOCUMENTS

| | | |
|---|---|---|
| CN | 106488265 A | 3/2017 |
| CN | 107360424 A | 11/2017 |

\* cited by examiner

VIDEO CODER-BASED CODE RATE CONTROL METHOD AND DEVICE, AND VIDEO SERVER

CROSS REFERENCE TO RELATED APPLICATIONS

The present application is a 35 U.S.C. § 371 National Phase conversion of International (PCT) Patent Application No. PCT/CN2018/095610, filed on Jul. 13, 2018, which claims priority of Chinese Patent Application No. 201710632656.9, filed on Jul. 28, 2017, the disclosure of which is incorporated by reference herein. The PCT International Patent Application was filed and published in Chinese.

FIELD OF THE INVENTION

The present invention lies in the field of videos, and particularly relates to a video coder-based code rate control method and device, and a video server.

BACKGROUND OF THE INVENTION

In live broadcast application, because of the fluctuation of network bandwidth, it is very important to control the output code rate of video coder in real time according to the current bandwidth to adapt to the bandwidth automatically. At present, there are many kinds of algorithms, mainly in the direction of more accurate bandwidth estimation and better code rate control strategy, but there is no research on how to make the video coder complete the code rate switching when it is necessary to switch the code rate, and ensure that coding is not interrupted.

At present, all kinds of video coders for live broadcasts generally provide Constant Code rate (CBR) or Variable Code rate (VBR) in the control of coding parameters. The output code rate of CBR is basically unchanged, and the output code rate of VBR will vary according to the content. However, in either mode, the coding rate cannot be modified or controlled in real time by software in the coding process.

The existing method of dynamic code rate control is to close the original video coder instance, then recreate a new video coder instance, and configure the new video coder at a code rate to be switched, which realizes the application of a new code rate parameter through the new video coder.

However, the problem resulted from the existing method is that, in a platform with limited resources, the video coder instance cannot be created arbitrarily. Thus, the original video coders must be turned off first, and then the new video coders can be created and started, such process needs to perform the following steps:

1. waiting for the original video coder to complete coding frames and output;
2. closing the original video coder;
3. creating, configuring and starting a new video coder; and
4. transferring the latest data to be coded to the new video coder, and starting the new encoder to code.

Coding cannot be performed during the above process, when switching code rate, only the new video coder completes initialization and then start coding frames, thus the output videos may be interrupted. Further, if the real-time frames to be coded cannot be temporarily stored or the temporary storage space is invalid, these frames are discarded during the switching period, then the final coded pictures will appear skipping frames.

SUMMARY OF THE INVENTION

Technical Problem

The present invention aims to provide a video coder-based code rate control method and device, a computer readable storage media and a video server, and solves the problems that: the existing method of dynamic code rate control needs to close the original video coder first, then recreate, configure and start a new video coder, which results that the output videos may be interrupted, the real-time frames may be discarded during the switching period, and the final coded pictures may appear skipping frames.

Technical Solution

A first aspect of the present invention provides a video coder-based code rate control method, comprising steps of:
modifying time stamps of frames transmitted to a video coder in a switching process when a code rate needs to be switched during video playback;
transmitting the frames having modified time stamps to the video coder; and
restoring time stamps of output frames to the original time stamps for each output frame of the video coder.

A second aspect of the present invention provides a video coder-based code rate control device, comprising:
a modifying unit, for modifying time stamps of frames transmitted to a video coder in a switching process when a code rate needs to be switched during video playback;
a transmitting unit, for transmitting the frames having modified time stamps to the video coder;
a restoring unit, for restoring time stamps of output frames to the original time stamps for each output frame of the video coder.

A third aspect of the present invention is to provide a computer readable medium having stored thereon, a set of computer-executable instructions for causing a processor to perform the steps of the video coder-based code rate control method above.

A fourth aspect of the present invention is to provide a video server, comprising:
one or more processors;
a non-transitory, computer readable memory; and
one or more computer-executable instructions; where the one or more computer-executable instructions are stored in the memory and are executable by the one or more processors to perform the steps of the video coder-based code rate control method above.

Advantages

In the present invention, time stamps of the frames transmitted to the video coder are modified in the switching process during the video playback, the time stamps of the output frames are restored to the original time stamps for each output frame of the video coder, in such way to control the actual code rate of the output frames of the video coder. No need to close the original video coder, or create or configure the new video coder, thus no coding interruption due to re-opening process, in live broadcasts or other real-time application scenes, there will not occur video stuck caused by coding interrupt, the switching process is very smooth.

DETAILED DESCRIPTION OF THE INVENTION

In order to make the objects, features and advantages of the invention clearer, the following is a detailed explanation of the invention in combination with the drawings and embodiments. It is understood that the embodiments described herein are only used to explain the invention and do not limit the protection scope of the invention.

In order to illustrate the technical features of the invention, the following are explained by specific embodiments.

First Embodiment

Figure 1:
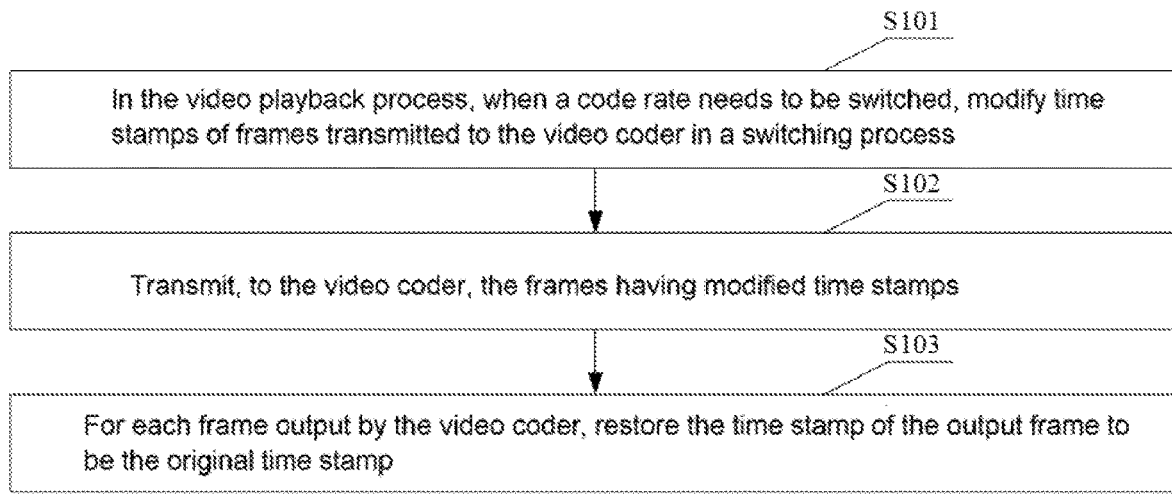
FIG. 1 is a flowchart illustrating a video coder-based code rate control method in accordance with a first embodiment of the present invention.

Referring to FIG. 1, a video coder-based code rate control method provided in the first embodiment of the present invention, comprising the following steps.

S101, modifying time stamps of frames transmitted to a video coder in a switching process when a code rate needs to be switched during video playback.

In the first embodiment of the present invention, step of S101 specifically comprises steps of:

modifying a first time stamp interval between neighbor frames at a first code rate to a second time stamp interval between neighbor frames at a second code rate when the first code rate needs to be switched to the second code rate during video playback, where a ratio of the second code rate to the first code rate is equal to a ratio of the second time stamp interval to the first time stamp interval; and modifying the time stamp of the current frames based on the actual time stamp of the latest frames transmitted to the video coder and the second time stamp interval between neighbor frames at the second code rate.

In the first embodiment of the present invention, before the step S101, the method further comprising steps of:

configuring a fixed frame rate and code rate, and transmitting frames based on correct time stamps to the video coder for coding during the video coder initialization; and coding by the video coder at the configured code rate, and outputting videos at a code rate being consistent with the configured code rate.

Where the correct time stamps mean that the time stamp interval between neighbor frames corresponds to the frame rate, thus the output video code rate by the video coder is consistent with the configured code rate.

S102, transmitting the frames having modified time stamps to the video coder; and S103, restoring time stamps of output frames to the original time stamps for each output frame of the video coder.

In the first embodiment of the present invention, step S103 can further comprises specific steps of:

creating a mapping table for the correct time stamps and the modified time stamps;

adding the original and modified time stamps of the modified frames to the mapping table accordingly;

finding the corresponding original time stamp from the mapping table based on the marked time stamp of the received frames, for each output frame of the video coder output; and restoring the time stamps of the output frames to original time stamps.

Because the actual time stamp of each frame transmitted to the video coder is changed, which results that the frame rate actually transmitted to the video coder is changed, and finally the code rate control of the video encoder is affected.

The following are examples.

Provided that the videos to be coded have a frame rate of 30 frames per second and an output code rate of 2 mbps, at some stage, the output code rate needs to be switched from 2 Mbps to 4 Mbps.

1. creating a video coder, and configuring a frame rate of 30 frames per second (correspondingly, the time stamp interval between neighbor frames is 33.33 ins) and a code rate of 2 Mbps;

2. transmitting the frames to the video coder, where the time stamp interval between the neighbor frames must correspond to the frame rate, for example, the first frame time is 0 ms, the second frame time is 33.33 ms, the third frame time is 66.66 ms, and so on, thereby the output video code rate by the video coder is consistent with the configured code rate, which is 2 mbps;

3. modifying the time stamp of each frame transmitted to the video coder according to the time stamp interval of 66.66 ms when the output code rate need to be switched to 4 Mbps; for example, the actual time stamp of the latest frame transmitted to the video coder is 2000 ms, normally, the time stamp of the next frame will be 2033.33 ms (interval between frames 33.33 ms), if making the interval between frames up to 66.66 ms, then modifying the time stamp of the current frames to 2066.66 ms and transmitting the modified frames to the video coder;

4. creating a mapping table for the correct time stamps and the modified time stamps;

5. adding the original and modified time stamps of the modified frames to the mapping table accordingly;

6. finding the corresponding original time stamp from the mapping table according to the marked time stamp of the received frames, for each output frame of the video coder output; and 7. restoring the time stamps of the output frames to the original time stamps.

Due to the time stamp interval of the frames transmitted to the video coder becomes 66.66 ins, in the video coder's view, the input frame sequence is changed to 15 frames per second, the total number of output bytes previously assigned to 30 frames (2 M bit), is assigned to 15 frames now, to ensure that the number of output bytes per second is constant, the average size of each frame will be 2 times of the original.

Through the above method, the output code rate of the video coder can be controlled to be the actual code rate at any stage during the coding process.

In first embodiment of the present invention, time stamps of the frames transmitted to the video coder are modified in the switching process during the video playback, the time stamps of the output frames are restored to the original time stamps for each output frame of the video coder, in such way to control the actual code rate of the output frames of the video coder. No need to close the original video coder, or create or configure the new video coder, thus no coding interruption due to re-opening process, in live broadcasts or other real-time application scenes, there will not occur video stuck caused by coding interrupt, the switching process is very smooth.

Second Embodiment

Figure 2:
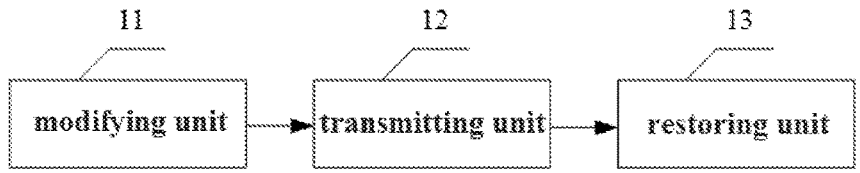
FIG. 2 is a diagram illustrating a video coder-based code rate control device in accordance with a second embodiment of the present invention.

Referring to FIG. 2, a video coder-based code rate control device in accordance with the second embodiment comprises:

a modifying unit 11, for modifying time stamps of frames transmitted to the video coder in a switching process when a code rate needs to be switched during video playback;

a transmitting unit 12, for transmitting the frames having modified time stamps to the video coder;

a restoring unit 13, for restoring time stamps of output frames to the original time stamps for each output frame of the video coder.

In the second embodiment of the present invention, the modifying unit 11 specifically comprises:

a first modifying subunit, for modifying a first time stamp interval between neighbor frames at a first code rate to a second time stamp interval between neighbor frames at a second code rate when the first code rate needs to be switched to the second code rate during video playback, where a ratio of the second code rate to the first code rate is equal to a ratio of the second time stamp interval to the first time stamp interval; and a second modifying subunit, for modifying the time stamp of the current frames based on the actual time stamp of the latest frames transmitted to the video coder and the second time stamp interval between neighbor frames at the second code rate.

In the second embodiment of the present invention, the restoring unit 13 can comprises:

a creating unit, for creating a mapping table for the correct time stamps and the modified time stamps;

an adding unit, for adding the original and modified time stamps of the modified frames to the mapping table accordingly;

a searching unit, for finding the corresponding original time stamp from the mapping table based on the marked time stamp of the received frames, for each output frame of the video coder output; and a restoring subunit, for restoring the time stamps of the output frames to the original time stamps.

Third Embodiment

In the third embodiment of the present invention, a computer readable medium having stored thereon, a set of computer-executable instructions for causing a processor to perform the steps of the video coder-based code rate control method provided in the first embodiment of the present invention.

Fourth Embodiment

Figure 3:
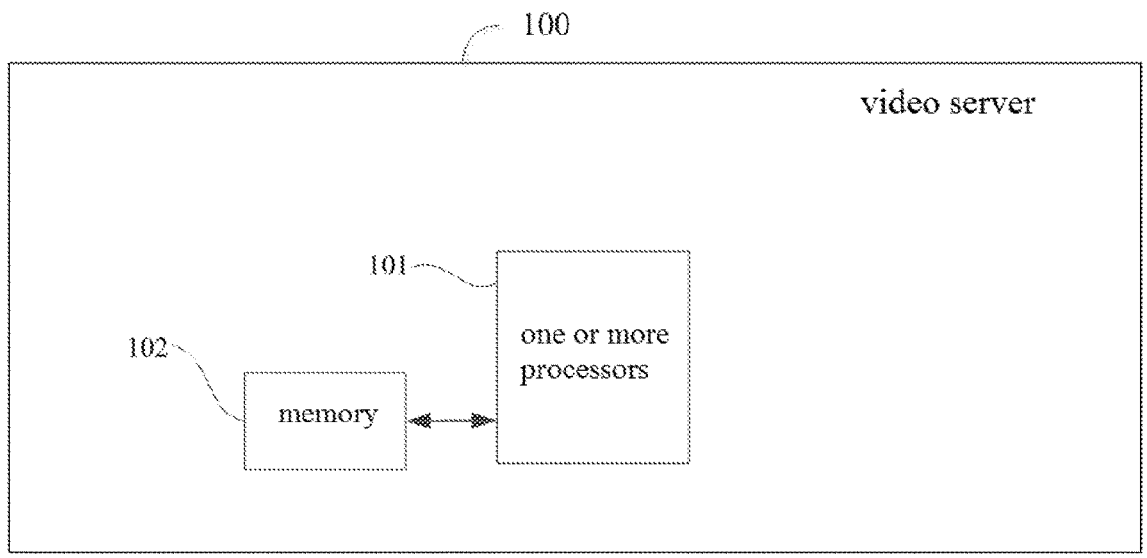
FIG. 3 is a diagram illustrating a video server in accordance with a fourth embodiment of the present invention.

FIG. 3 illustrates a block diagram of the video server provided in the fourth embodiment of the present invention, the video server comprises:

one or more processors 101;

a non-transitory, computer readable memory 102; and or more computer-executable instructions; where the one or more computer-executable instructions are stored in the memory 102 and are executable by the one or more processors 101 to perform the steps of the video coder-based code rate control method provided in the first embodiment.

The above mentioned is preferred embodiments of the invention and is not used to limit the invention. Any modification, equivalent replacement and improvement made within the spirit and principles of the invention, shall be included in the protection scope of the invention.

What is claimed is:

1. A video coder-based code rate control method, comprising steps of:

modifying time stamps of frames transmitted to a video coder in a switching process when a code rate needs to be switched during video playback;

transmitting the frames having modified time stamps to the video coder; and restoring time stamps of output frames to the original time stamps for each output frame of the video coder;

wherein the step of modifying time stamps of frames transmitted to a video coder in a switching process when a code rate needs to be switched during video playback, specifically comprising steps of:

modifying a first time stamp interval between neighbor frames at a first code rate to a second time stamp interval between neighbor frames at a second code rate when the first code rate needs to be switched to the second code rate during video playback, where a ratio of the second code rate to the first code rate is equal to a ratio of the second time stamp interval to the first time stamp interval; and modifying the time stamp of the current frames based on the actual time stamp of the latest frames transmitted to the video coder and the second time stamp interval between neighbor frames.

2. The method of claim 1, wherein, before the step of modifying time stamps of frames transmitted to a video coder in a switching process when a code rate needs to be switched during video playback, the method further comprises steps of:

configuring a fixed frame rate and code rate, and transmitting frames based on correct time stamps to the video coder for coding during the video coder initialization; and coding by the video coder at the configured code rate, and outputting videos at a code rate being consistent with the configured code rate.

3. The method of claim 2, wherein the correct time stamps mean that a time stamp interval between neighbor frames corresponds to the frame rate, whereby the output video code rate by the video coder is consistent with the configured code rate.

4. The method of claim 1, wherein the step of restoring time stamps of output frames to the original time stamps for each output frame of the video coder, specifically comprises steps of:

creating a mapping table for correct time stamps and modified time stamps;

adding both the original time stamps and the modified time stamps of the modified frames to the mapping table accordingly;

finding the corresponding original time stamp from the mapping table based on the marked time stamp of the received frames, for each output frame of the video coder output; and restoring the time stamps of the output frames to original time stamps.

5. A non-transitory computer readable medium having stored thereon, a set of computer-executable instructions for causing one or more processors to perform the steps of the video coder-based code rate control method of claim 1.

6. A video server, comprising:
one or more processors;
a non-transitory, computer readable memory; and
one or more computer-executable instructions; where the one or more computer-executable instructions are stored in the memory and are executable by the one or more processors to perform the steps of:
modifying time stamps of frames transmitted to a video coder in a switching process when a code rate needs to be switched during video playback;
transmitting the frames having modified time stamps to the video coder; and
restoring time stamps of output frames to the original time stamps for each output frame of the video code;
wherein the step of modifying time stamps of frames transmitted to a video coder in a switching process when a code rate needs to be switched during video playback, specifically comprising steps of:
modifying a first time stamp interval between neighbor frames at a first code rate to a second time stamp interval between neighbor frames at a second code rate when the first code rate needs to be switched to the second code rate during video playback, where a ratio of the second code rate to the first code rate is equal to a ratio of the second time stamp interval to the first time stamp interval; and
modifying the time stamp of the current frames based on the actual time stamp of the latest frames transmitted to the video coder and the second time stamp interval between neighbor frames.

7. The video server of claim 6, wherein, before the step of modifying time stamps of frames transmitted to a video coder in a switching process when a code rate needs to be switched during video playback, the method further comprises steps of:
configuring a fixed frame rate and code rate, and transmitting frames based on correct time stamps to the video coder for coding during the video coder initialization; and
coding by the video coder at the configured code rate, and outputting videos at a code rate being consistent with the configured code rate.

8. The video server of claim 7, wherein the correct time stamps mean that a time stamp interval between neighbor frames corresponds to the frame rate, whereby the output video code rate by the video coder is consistent with the configured code rate.

9. The video server of claim 6, wherein the step of restoring time stamps of output frames to the original time stamps for each output frame of the video coder, specifically comprises steps of:
creating a mapping table for correct time stamps and modified time stamps;
adding both the original time stamps and the modified time stamps of the modified frames to the mapping table accordingly;
finding the corresponding original time stamp from the mapping table based on the marked time stamp of the received frames, for each output frame of the video coder output; and
restoring the time stamps of the output frames to original time stamps.

* * * * *